US009874491B2

(12) United States Patent
Fechner et al.

(10) Patent No.: US 9,874,491 B2
(45) Date of Patent: Jan. 23, 2018

(54) CUVETTE SYSTEM AND METHODS FOR THE INSPECTION OF OPHTHALMIC LENSES

(71) Applicant: Novartis AG, Basel (CH)

(72) Inventors: Susanne Fechner, Aschaffenburg (DE); Daniel Kessler, Lützelhausen (DE); Roger Biel, Aschaffenburg (DE); Michael Stutz, Kleinwallstadt (DE)

(73) Assignee: Novartis AG, Basel (CH)

( * ) Notice: Subject to any disclaimer, the term of this patent is extended or adjusted under 35 U.S.C. 154(b) by 120 days.

(21) Appl. No.: 14/946,436

(22) Filed: Nov. 19, 2015

(65) Prior Publication Data

US 2016/0146698 A1    May 26, 2016

Related U.S. Application Data

(60) Provisional application No. 62/084,150, filed on Nov. 25, 2014.

(51) Int. Cl.
*G01M 11/02* (2006.01)
(52) U.S. Cl.
CPC .............. *G01M 11/0214* (2013.01)
(58) Field of Classification Search
CPC ............. G01M 11/14; G01M 11/0207; G01M 11/0278
See application file for complete search history.

(56) References Cited

U.S. PATENT DOCUMENTS

| 4,260,252 | A | * | 4/1981 | Wittenberg | ........ G01M 11/0214 356/124 |
| 4,415,076 | A | | 11/1983 | Campbell | |
| 5,847,819 | A | | 12/1998 | Yanagi | |
| 6,047,082 | A | * | 4/2000 | Rhody | ............... G01M 11/0207 382/141 |
| 6,259,518 | B1 | | 7/2001 | Aldridge | |

(Continued)

FOREIGN PATENT DOCUMENTS

WO    2003/016855 A1    2/2003

OTHER PUBLICATIONS

PCT International Search Report dated Feb. 25, 2016 International Application No. PCT/EP/2015/077035, International Filing Date Nov. 19, 2015.

(Continued)

*Primary Examiner* — Sang Nguyen
(74) *Attorney, Agent, or Firm* — Sheng-Hsin Hu

(57) ABSTRACT

A cuvette system (1) for use in the optical inspection of ophthalmic lenses comprises at least one receptacle (2) for accommodating an ophthalmic lens. The receptacle (2) has a longitudinal extension and an opening (20) arranged at one longitudinal end thereof. The receptacle (2) is adapted for containing a liquid. The cuvette system further comprises at least one inspection window (3) having an inspection surface (31). The inspection window (3) is arranged stationary and from the receptacle (2). The inspection window (3) is adapted for being joined to the receptacle (2) at the opening (20) of the receptacle (2) such that the inspection surface (31) of the inspection window (3) is immersed in the liquid. The inspection window (3) is further adapted for being removed from the opening (20) of the receptacle (2).

10 Claims, 4 Drawing Sheets

(56) References Cited

U.S. PATENT DOCUMENTS

| | | | | |
|---|---|---|---|---|
| 6,606,150 B2* | 8/2003 | Bickert | ............. | G01M 11/0207 206/5.1 |
| 6,788,399 B2* | 9/2004 | Frumusa | ............ | G01M 11/0278 356/124 |
| 6,909,503 B2* | 6/2005 | Baske | ................ | G01M 11/0207 356/246 |
| 7,423,747 B2* | 9/2008 | Biel | ................... | G01M 11/0207 356/244 |
| 8,651,774 B2* | 2/2014 | Biel | ................... | B29D 11/0024 206/5.1 |
| 2009/0219517 A1* | 9/2009 | Lassig | ................ | B29D 11/0024 356/124 |
| 2009/0231576 A1* | 9/2009 | Suppel-Adrian | .. | G01M 11/0207 356/246 |
| 2014/0174956 A1* | 6/2014 | Biel | ..................... | A45C 11/005 206/5.1 |
| 2015/0150346 A1* | 6/2015 | Yasuda | ................ | A45C 11/005 206/5.1 |

OTHER PUBLICATIONS

PCT Written Opinion of the International Searching Authority dated Feb. 25, 2016, International Application No. PCT/EP/2015/077035, International Filing Date Nov. 19, 2015.

* cited by examiner

CUVETTE SYSTEM AND METHODS FOR THE INSPECTION OF OPHTHALMIC LENSES

This application claims the benefit under 35 U.S.C. § 119 (e) of U.S. provisional Application No. 62/084,150 filed Nov. 25, 2014, herein incorporated by reference in its entirety.

FIELD

The invention relates to a cuvette system for use in the inspection of ophthalmic lenses, to a method for the inspection of ophthalmic lenses, and to a lens inspection module for the optical inspection of ophthalmic lenses.

BACKGROUND

It is known to produce ophthalmic lenses, in particular contact lenses such as soft contact lenses, in an automated production process with reusable molds. Such automated production of hard and soft contact lenses is very efficient and allows the mass production also of contact lenses, which are worn only once and then replaced with new contact lenses. In order to ensure a high and constant quality level of the contact lenses, the produced contact lenses are optically inspected.

However, ophthalmic lenses, in particular soft contact lenses, are difficult to inspect using mechanical means for holding them during inspection. It is known to hold the contact lenses immersed in a liquid, for example water, in a cuvette for the purpose of optical inspection. The cuvette comprises a receptacle which may be made of a light-transmitting material either entirely or at least along the optical axis of the optical inspection system, and an inspection window arranged in an opening of the receptacle. To create the conditions required for such optical inspection of contact lenses, it is on one hand necessary to ensure that the liquid, the inspection window and the walls of the receptacle which are arranged in the optical path during inspection, are clean. On the other hand, there must not be a free boundary surface of the liquid which may adversely affect the image, and no air bubbles must be present between the inspection window and the liquid. Accordingly, the underside (lower surface) of the inspection window is immersed in the liquid contained within the receptacle.

For inspection, the cuvette containing the contact lens to be inspected is placed in the optical path of the optical inspection system in a manner such that an image of the contact lens may be recorded by a camera, which may comprise a suitable image-resolving sensor.

In a known cuvette, the receptacle and the inspection window are fixedly pre-assembled to form a one-piece cell, with the inspection window closing an upper opening of the receptacle. In order to be able to fill the cell with liquid and to insert and remove the contact lens from the cell, the one-piece cell is provided with a lateral extension forming a handling channel, which is arranged inclined with regard to a longitudinal axis of the cell by an angle of about 45°. A bottom of the one-piece cell is shaped in such a manner, that the cell may be tilted from a stable handling position in which the cell can be filled with liquid and in which the lens can be inserted and removed from the cell, to a stable inspection position in which the inspection window is aligned with the optical axis of the and back again. For optical inspection of the contact lens, the one-piece cell first is filled with a liquid, usually water, in a filling station. To perform the filling action, the cell is arranged in its handling position, with an axis of the handling channel extending about parallel to the optical axis. Subsequently, the cell is loaded with the contact lens to be inspected at a lens loading station through the handling channel. Thereafter, the one-piece cell is tilted to its inspection position and transported to an inspection station. After the contact lens has been optically inspected, the cell is transported away from the inspection station, whereupon the cell is tilted back again to its handling position. In this handling position, the contact lens is removed from the one-piece cell, the liquid is removed from the cell, and the cell is transported back again to the filling station. The above-described cycle can then start anew.

Once the contact lens is inserted into the liquid contained in the one-piece cell and is allowed to settle down, a certain time period elapses until the lens has settled down to its rest position at the bottom of the cell. As the one-piece cell is tilted from the loading position into the inspection position, the liquid inside the cell is agitated. This results in the contact lens leaving its rest position again and floating in the liquid. Thus, before the lens can be optically inspected it must be allowed to settle down to its rest position again. The time period that elapses until the contact lens has settled down to its rest position at the bottom of the cell is generally comparable to the time period for the initial settling down after the loading of the contact lens. When the one-piece cell is tilted back to its loading position after the optical inspection of the contact lens, the liquid inside the cell is agitated again and, as a result, the lens floats in the liquid again. Before the lens can be removed from the cell, for example with the aid of a suction gripper which is inserted through the handling channel of the cell, it must again be waited until the lens has settled down to its rest position at the bottom of the cell. The time period that elapses each time until the contact lens floating in the liquid inside the cell has settled down into its rest position at the bottom of the cell may, for example, amount from about fifteen seconds to about twenty-five seconds, in order to be sure that the lens has completely settled down. During this time period neither an optical inspection of the contact lens can be performed, nor can the contact lens be removed from the cell. It is evident that such 'waiting' periods are inefficient in an automated contact lens production process. Accordingly, one object of the invention is to avoid such 'waiting' periods in order to further increase the efficiency of the production process.

When the contact lens is optically inspected the optical inspection system may also obtain positional information about the contact lens which is in its rest position at the bottom of the one-piece cell. Such positional information may, for example, be used for the positional control of a suction gripper or similar device used for the removal of the contact lens from the cell. However, in the afore-described case where the one-piece cell is tilted after inspection and, accordingly, the contact lens leaves its rest position and settles down again to a new rest position, such positional information is not accurate, because the contact lens usually will not settle down at the identical rest position at the bottom of the cell. Accordingly, another object of the invention is to be able to make use of contact lens positional information which has been obtained during optical inspection of the contact lens in order to improve the accuracy of the lens gripping process.

SUMMARY OF THE INVENTION

In one aspect, the present invention relates to a cuvette system for use in the optical inspection of ophthalmic lenses, in particular contact lenses. The cuvette system comprises at least one receptacle for accommodating an ophthalmic lens. The at least one receptacle has a longitudinal extension and an opening arranged at one longitudinal end of the receptacle, and the at least one receptacle is adapted for containing a liquid. The cuvette system further comprises at least one inspection window having an inspection surface. The at least one inspection window is arranged stationary and separate from the at least one receptacle. The at least one inspection window is adapted for being joined to the at least one receptacle at the opening of the at least one receptacle such that the inspection surface of the at least one inspection window is immersed in the liquid. The at least one inspection window is further adapted for being removed from the opening of the at least one receptacle.

In accordance with one aspect of the cuvette system according to the invention, the at least one receptacle is of cuplike shape having a bottom which is arranged opposite to the opening. An inspection trough is provided in the bottom for accommodating the ophthalmic lens.

In accordance with a further aspect of the cuvette system according to the invention, the at least one receptacle comprises abutment lugs arranged at the longitudinal end of the at least one receptacle where the opening is arranged. The abutment lugs protrude axially away from the at least one receptacle at the longitudinal end.

In accordance with another aspect of the cuvette system according to the invention, the at least one inspection window is detachably mounted within a tubular housing having a free end. The at least one inspection window protrudes from the free end of the tubular housing.

In accordance with still a further aspect of the cuvette system according to the invention, the tubular housing comprises a flange extending radially outwardly from said tubular housing. The tubular housing is rotatably arranged between a first end position, in which the at least one inspection window is removed from the at least one receptacle, and a second end position, in which the flange of the tubular housing abuts against the abutment lugs arranged at the longitudinal end of the at least one receptacle.

In accordance with yet a further aspect of the cuvette system according to the invention, the tubular housing is biased towards the free end thereof.

In accordance with another aspect of the cuvette system according to the invention, for biasing the tubular housing towards the free end thereof a helical compression spring is arranged in between the flange and a mounting panel to which the tubular housing is mounted.

In accordance with still a further aspect of the cuvette system according to the invention, the cuvette system comprises two or more of said receptacles which are arranged in linear configuration and are adapted for being simultaneously transported. The cuvette system further comprises a number of the inspection windows corresponding to the number of the receptacles. Each of the inspection windows is associated to a corresponding one of the receptacles. The associated inspection windows are arranged stationary and separate from the receptacles in a corresponding linear configuration. The associated inspection windows are adapted for being simultaneously positioned in the openings of the receptacles such that the inspection surfaces of the inspection windows are immersed in the liquid. The associated inspection windows are further adapted for being simultaneously removed from the openings of the receptacles.

In accordance with another aspect of the cuvette system according to the invention, the cuvette system further comprises a drainboard arranged underneath the linear configuration of the inspection windows and extending parallel to the mounting panel.

A further aspect of the invention relates to a method for the inspection of ophthalmic lenses, in particular contact lenses. The method comprises the steps of:
providing a cuvette system according to the invention as described above;
filling the at least one receptacle of the cuvette system with a liquid;
loading the at least one receptacle with an ophthalmic lens;
transporting the at least one receptacle loaded with the ophthalmic lens to an inspection station;
in the inspection station joining the at least one receptacle with the at least one inspection window such, that the inspection surface of the at least one inspection window is immersed in the liquid contained in the at least one receptacle;
in the inspection station optically inspecting the ophthalmic lens within the liquid in the at least one receptacle;
after inspection of the ophthalmic lens in the inspection station, removing the at least one inspection window from the at least one receptacle; and
transporting the at least one receptacle away from the inspection station.

In accordance with one aspect of the method according to the invention, the at least one inspection window is joined with the at least one receptacle with an infeed speed of the inspection surface of the at least one inspection window in the range of 0.05 m/s to 0.16 m/s. The at least one inspection window is removed from the at least one receptacle with a retracting speed of the inspection surface of the at least one inspection window in the range of 0.05 m/s to 0.16 m/s.

In accordance with a further aspect of the method according to the invention, the inspection surface of the at least one inspection window has a leading edge. During joining of the at least one inspection window and the at least one receptacle the leading edge of the inspection surface encloses an angle with a surface of the liquid contained in the at least one receptacle in the range of 7° to 21° at the time the leading edge contacts the upper surface of the liquid to get immersed in the liquid.

Yet a further aspect of the invention is related to a lens inspection module for the optical inspection of ophthalmic lenses, in particular of contact lenses. The lens inspection module comprises a cuvette system according to the invention as described above, and a lens inspection station comprising at least one optical inspection system.

In accordance with one aspect of the lens inspection module according to the invention, the lens inspection module comprises a plurality of the receptacles arranged in linear configuration. The lens inspection station further comprises a corresponding plurality of the inspection windows arranged stationary and separate from the plurality of receptacles in the inspection station in a linear configuration corresponding to the linear configuration of the plurality of receptacles. The lens inspection module further comprises a transport system for transporting the plurality of receptacles arranged in linear configuration to the inspection station and away from the inspection station, with each of the inspection windows of the corresponding plurality of inspection windows being associated to a different individual receptacle of the plurality of receptacles. Each of the inspection windows of the plurality of the inspection windows is adapted for being positioned in the opening of the associated individual receptacle of the plurality of receptacles such that the inspection surface of the associated inspection window is immersed in the liquid in the associated individual receptacle. Each of the inspection windows of the plurality of the inspection windows is further adapted for being removed from the opening of the associated receptacle. The at least one optical inspection system is movably arranged in the inspection station along the plurality of receptacles arranged in linear configuration and joined with the associated inspection windows.

In accordance with another aspect of the lens inspection module according to the invention, the at least one optical inspection system on one hand and the at least one inspection window or each inspection window of the plurality of inspections windows on the other hand are arranged in spatial vicinity and aligned with respect to each other, to allow for taking an optical image of the ophthalmic lens contained within the at least one receptacle or of each ophthalmic lens contained within each individual receptacle of the plurality of receptacles through the inspection window or through each inspection window of the plurality of inspection windows, respectively.

In accordance with still a further aspect of the lens inspection module according to the invention, the at least one optical inspection system comprises an image-resolving sensor.

By providing a cuvette system comprising a receptacle having an opening at one longitudinal end of the receptacle, typically at the top of the receptacle, and an inspection window, which is kept separate from the receptacle and which is arranged stationary within an inspection station, the need for tilting the receptacle from a handling position to an inspection position and back is eliminated. As a consequence, waiting times allowing the ophthalmic lens (in the following only contact lenses are referred to by way of example) to settle down as described in the context of the prior art one-piece cells are eliminated, because due to the no longer existing tilting action the contact lens remains in its rest position at the bottom of the receptacle of the cuvette system. In addition, any positional information about the contact lens within the receptacle of the cuvette system which may have been obtained during optical inspection of the contact lens remains valid and may be subsequently used for controlling the position of a removal device (e.g. a gripper) for removing the contact lens from the receptacle. Unlike the one-piece fixedly assembled cell of the prior art, the inspection window is arranged separate from the receptacle and stationary at the inspection station. Only at the inspection station the receptacle and the corresponding inspection window are joined with each other. Thus, one and the same inspection window may be used in combination with different receptacles. Due to the fact that the individual receptacle does not have an inspection window permanently mounted thereto, the filling and emptying of the receptacle with liquid, usually water, as well as the loading and unloading of the receptacle with the contact lens are facilitated. Also, the cleaning of the receptacle may be accomplished much easier than with the one-piece cell of the prior art. The inspection window may be made, for example, from glass, quartz glass, or acrylic glass.

The inspection trough in the bottom of the receptacle ensures that the contact lens maintains its rest position for the optical inspection. The inspection trough may be provided in a transparent bottom, which allows an easy illumination of the contact lens from beneath for the optical inspection thereof.

The abutment lugs protruding from the upper longitudinal end of the receptacle may facilitate the correct and well-defined placement of the inspection window with respect to the liquid filled receptacle. For example, three such abutment lugs may be provided around the circumference.

The tubular housing serves as a carrier element for the inspection window. In case it is necessary to replace the inspection window, the inspection window can be easily replaced while the tubular housing can be further used. The tubular housing is open at the longitudinal end opposite the free end of the tubular housing from which the inspection window protrudes, and thus allows the optical inspection system to have a free view through the inspection window.

The rotational arrangement of the tubular housing to which the inspection window is mounted results in short movement distances and saves space. The radially outwardly extending flange of the housing at a side closer to the opening of the receptacle may radially protrude outwardly from the tubular housing a smaller distance than on an opposite side of the tubular housing. Thus, the tubular housing may be arranged spatially closer to an inspection position of the receptacle in the inspection station, without a rim of the receptacle obstructing the rotational movement of the tubular housing to which the inspection window is detachably mounted towards the receptacle. The radially extending flange ensures a proper alignment of the inspection window relative to the opening of the receptacle. The receptacle containing the contact lens is filled with a liquid, usually water. Thus, the protruding lugs arranged at the top end of the receptacle and the radially extending flange of the housing to which the inspection window is mounted ensure that during inspection of the contact lens the inspection surface of the inspection window is properly immersed in the liquid. By having the inspection window properly immersed in the liquid, faulty optical inspection results which may result, for example, from movements of the surface of the liquid within the receptacle can be avoided. By mounting the tubular housing in a biased manner, for example spring-biased, it is made sure that the inspection surface of the inspection window is arranged at a defined immersion depth in the liquid. Differences of the lengths of the abutment protrusions at different receptacles can thus be compensated for. A helical compression spring may be a simple and well-working mechanical element which may be easily mounted for achieving this function.

In mass production of contact lenses usually a number of contact lenses are manufactured simultaneously. Consequently, also a number of contact lenses may be optically inspected simultaneously or successively. For that purpose two or more receptacles are arranged in linear configuration and are adapted for being simultaneously transported. A corresponding number of inspection windows are arranged separate from the receptacles and stationary in corresponding linear configuration within the inspection station. The inspection windows are adapted for being simultaneously positioned in the openings of the receptacles and for simultaneous removal from the openings of the receptacles.

In order to avoid the spillage of water a drainboard may be mounted underneath the linear configuration of the inspection windows, and this drainboard extends about parallel to the mounting panel to which the tubular housings carrying the inspection windows are mounted.

As regards the method according to the invention and as already described in connection with the cuvette system according to the invention, tilting or re-positioning the cuvette system is not required anymore. Accordingly, a contact lens contained within the receptacle remains in its rest position. Any additional waiting time until the contact lens has settled down again in its rest position after tilting of the receptacle, as is required in the method of the prior art, is therefore eliminated. Due to the fact that the contact lens remains in its rest position within the receptacle after the optical inspection has been finished, any positional information about the contact lens, which may have been obtained during the optical inspection, remains valid and may be used, for example, for a more accurate positioning of a removal device (e.g. a gripper) for the removal of the contact lens from the receptacle. Due to the inspection window or the inspection windows being arranged and joined with the receptacles in the inspection station, only one inspection window or one set of inspection windows must be provided which is arranged in the inspection station and which is/are joined with the one or more receptacles moved into the inspection station, which is/are removed from the receptacles after inspection of the contact lens contained in the respective receptacle, and which is then reused again with the next one or more receptacles moved into the inspection station.

In order to avoid any undue agitation or even splashing of the liquid (e.g. water) within each receptacle, each inspection surface of the respective inspection window may be joined with and/or separated from its corresponding receptacle with an infeed speed in the range of 0.05 m/s to 0.16 m/s, and is removed from the receptacle with a retracting speed in the range of 0.05 m/s to 0.16 m/s. By controlling the speed with which the inspection surface of the respective inspection window is immersed into or removed from the liquid also a formation and entrapment of air bubbles at a front surface of the inspection window may be avoided.

Each inspection surface of the respective inspection window may have a leading edge which during joining of the inspection window with the respective receptacle encloses an angle in the range of 7° to 21° at the time the respective leading edge contacts the upper surface of the liquid to get immersed in the liquid. At these angles any air bubbles are prevented from occurring beneath the inspection surface of the respective inspection window upon immersing the inspection surface of the respective inspection window in the liquid contained in the respective receptacle.

BRIEF DESCRIPTION OF THE DRAWINGS

Further details and advantages of the invention will become apparent from the following description of exemplary embodiments thereof, reference being made to the schematic drawings, which are not to scale, in which.

DETAILED DESCRIPTION OF EMBODIMENTS

Figure 1A:
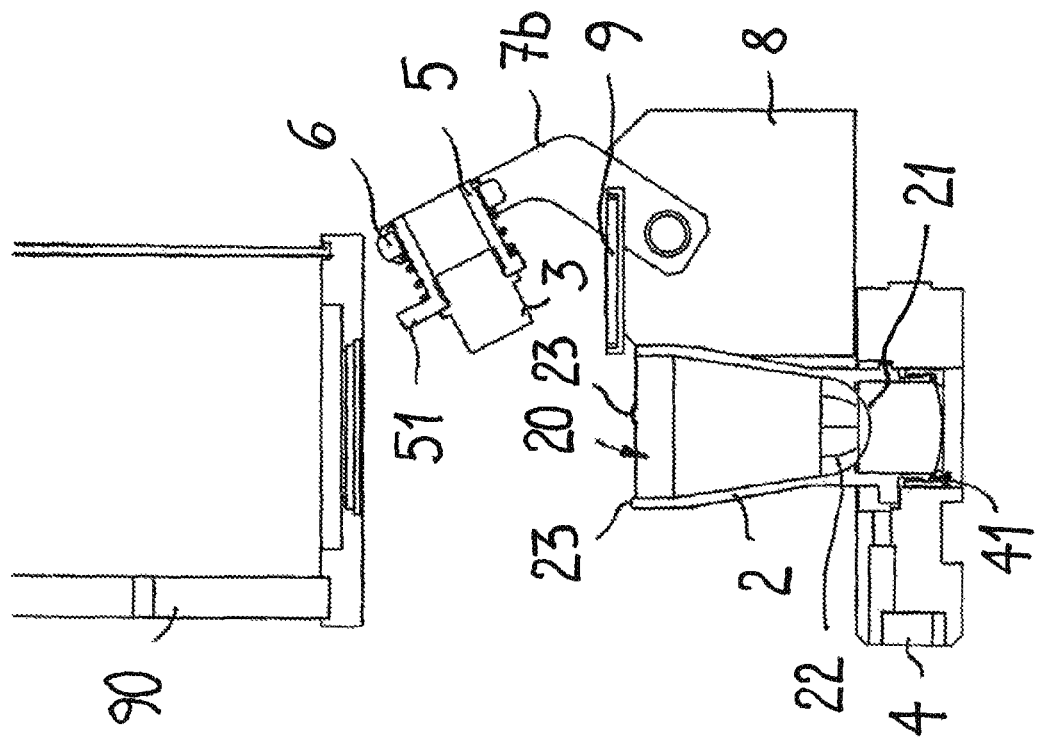
FIGS. 1a and 1b show a side view and a sectional side view of a lens inspection module comprising a receptacle and an associated inspection window in retracted configuration and a lens inspection system.
Figure 1B:
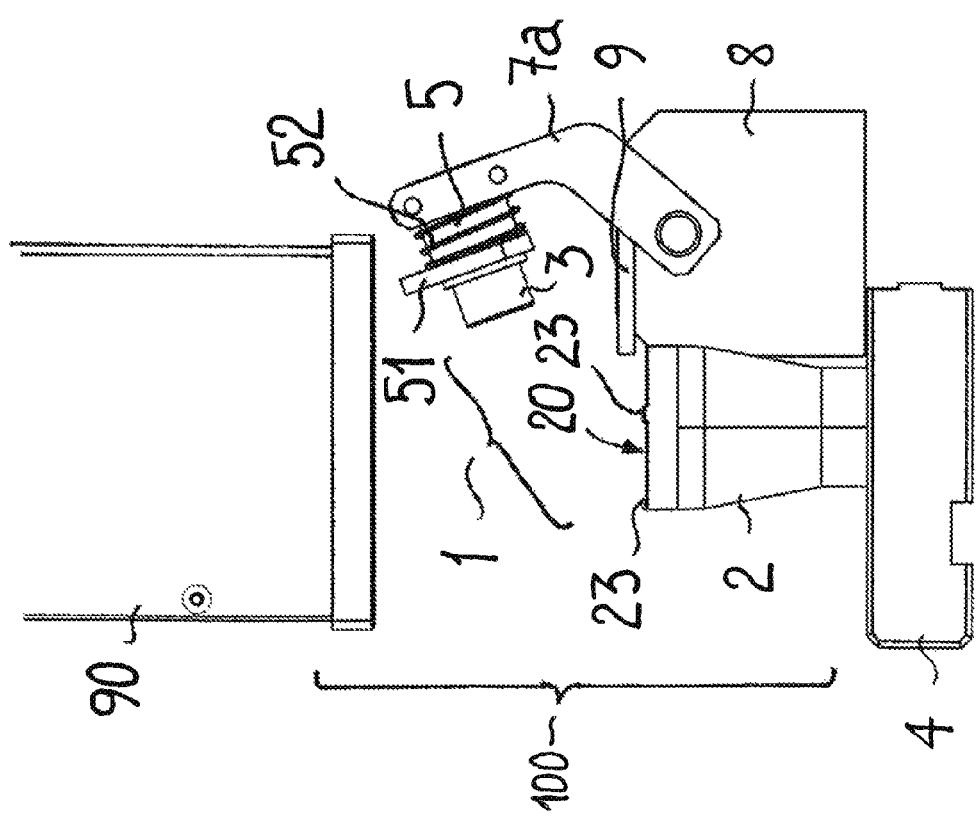

In FIGS. 1a and 1b there is shown in a side view and in a sectional side view, respectively, an inspection module 100 for the inspection of ophthalmic lenses, in particular contact lenses, which may be arranged in an inspection station of an automated lens manufacturing line. Inspection module 100 comprises one or more receptacles 2 of generally cuplike shape (only one receptacle 2 being shown in FIG. 1a and FIG. 1b visible) having an opening 20, and an inspection window 3, which, taken together, form part of a cuvette system 1. Inspection module 100 further comprises an optical inspection system 90. The optical inspection system 90 comprises at least one image-resolving sensor, and may in particular comprise at least one CCD-camera. In an inspection position, receptacle 2 extends along an optical axis of the optical inspection system 90. While a plurality of receptacles and a corresponding plurality of inspection windows may be provided in the inspection station (see further below with reference to FIG. 4), the following description of FIG. 1a, FIG. 1b, FIG. 2a, FIG. 2b, FIG. 3a and FIG. 3b only refers to one single receptacle 2 and one single inspection window 3 for the sake of simplicity.

Receptacle 2 and inspection window 3 of cuvette system 1 are only joined in the inspection station. For that purpose, inspection window 3 is arranged stationary in the inspection station, while receptacle 2 may be transported to and from the inspection station. For the transport of the receptacle 2, the latter is mounted to a carrier 4 which is transported by a suitable transport system (not shown). The bottom 21 of the receptacle 2 may be transparent. Carrier 4 may be provided with a receiving bore 41 for receiving a lower portion of receptacle 2 to allow for the mounting of receptacle 2 to carrier 4. Receiving bore 41 in the inspection station allows for illumination of the transparent bottom 21 of the receptacle 2 from beneath, which in FIGS. 1a and 1b is the side opposite to the side where the optical inspection system 90 is arranged relative to the receptacle 2. The bottom 21 of the cuplike receptacle 2 may be provided with an inspection trough 22 for accommodating a contact lens to be inspected. A contact lens, when inserted into a bath of liquid, such as water, always orients itself with its concave side facing upwards. This is made use of in the optical inspection of the contact lens. Accordingly, before inserting a contact lens into the receptacle 2 the latter is filled with liquid, typically water, in a filling station upstream of the inspection station. In a loading station the contact lens is loaded into receptacle 2 where the contact lens is allowed to sink down and settle in its rest position in the inspection trough 22 at the bottom 21 of receptacle 2. At that longitudinal end of the receptacle 2 having the opening 20 abutment lugs 23 are provided which protrude axially upwards.

Inspection window 3 is arranged stationary in the inspection station. More particularly, in the embodiment shown inspection window 3 is detachably mounted within a tubular housing 5, with inspection window 3 protruding from a free end of tubular housing 5. Tubular housing 5 is mounted to a mounting panel 6, which bridges two levers 7a, 7b. Tubular housing 5 is biased towards the free end thereof by means of a helical compression spring 52, which is arranged between mounting panel 6 and a flange 51 extending radially outwardly from the tubular housing 5. The two levers 7a, 7b are connected to a drive, which is accommodated in a housing 8. When a receptacle 2 is detected within the inspection station in a proper position for inspection, the drive rotates levers 7a, 7b and mounting panel 6 together with tubular housing 5 and inspection window 3 from a retracted position (FIGS. 1a and 1b) to an inspection position (FIGS. 3a and 3b), in which the inspection window 3 is positioned within opening 20 of the receptacle 2, and back again. It should be noted, that only one single lever may be sufficient for carrying and rotating mounting plate 6 together with tubular housing 5 and inspection window 3 protruding from tubular housing 5 from the initial retracted position to the inspection position, and back again. Tubular housing 5 is open at its longitudinal end opposite inspection window 3 and allows the optical inspection system 90 a free view through inspection window 3. A drainboard 9 may be mounted underneath the free end of tubular housing 5 from which inspection window 3 protrudes. For example, drainboard 9 may be fixedly attached to housing 8 which accommodates the drive for the levers 7a, 7b.

Figure 2A:
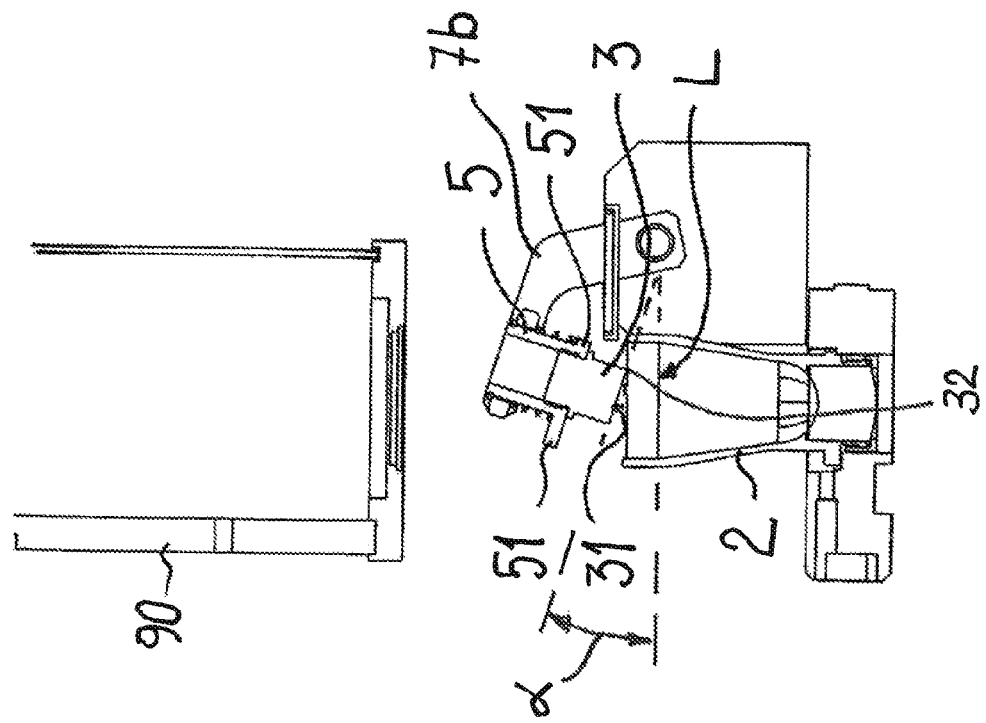
FIGS. 2a and 2b show the lens inspection module of FIGS. 1a and 1b with the receptacle and the associated inspection window in an intermediate position, both, in a side view and in a sectional side view.
Figure 2B:
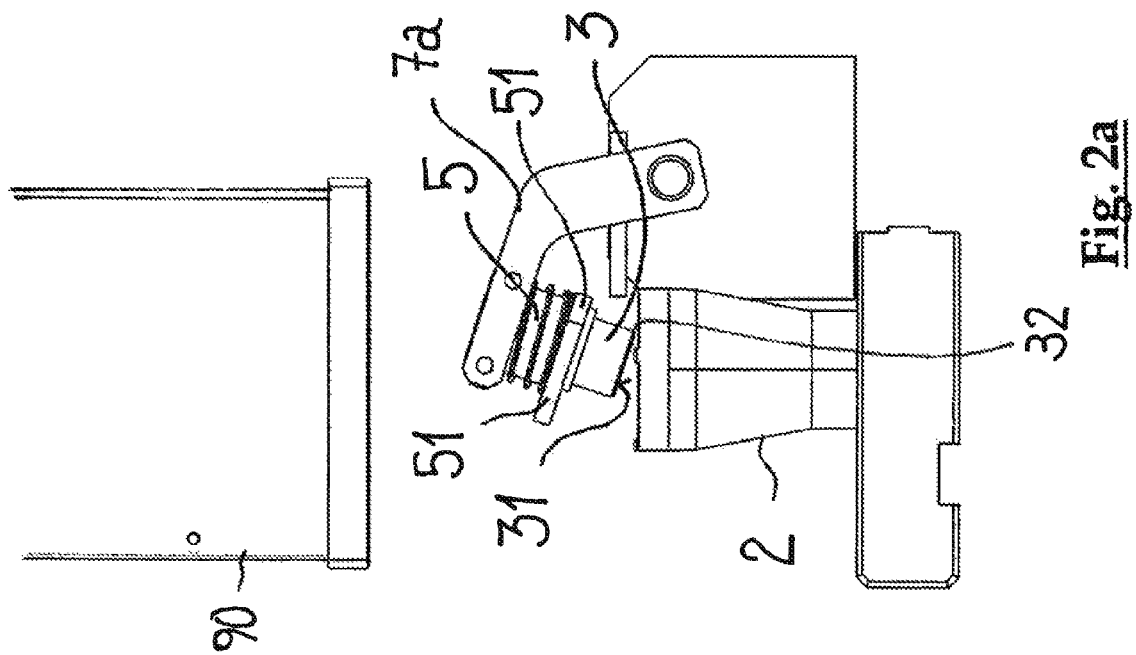

In FIGS. 2a and 2b receptacle 2 and inspection window 3 are shown in an intermediate position during movement of inspection window 3 towards receptacle 2. As can be seen, the radially outwardly extending flange 51 at a side closer to the opening 20 of the receptacle 2 extends radially outwardly a smaller distance than on at an opposite side of tubular housing 5. Thus, it is possible to arrange tubular housing 5 spatially closer to an inspection position of the receptacle 2 in the inspection station, without a rim of receptacle 2 obstructing the rotational movement of tubular housing 5 to which inspection window 3 is mounted towards receptacle 2.

The speed of the movement of inspection window 3 towards the opening 20 of receptacle 2 is selected such, that any undue agitation of the liquid within the receptacle can be avoided. While during a first phase of the movement of the inspection window 3 to the inspection position (no contact between the inspection window 3 and the liquid contained in receptacle 2) the movement may occur at a higher speed, at least during a second phase of the movement of the inspection window 3 to the inspection position (starting shortly before the first contact between the inspection window and the liquid contained in receptacle 2) an infeed speed of an inspection surface 31 (front surface) of inspection window 3 into the receptacle 2 filled with liquid may be in the range of 0.05 m/s to 0.16 m/s until the inspection surface 31 is completely immersed in the liquid. The same range for the speed can be selected for the retraction of inspection surface 31 of inspection window 3 from the liquid. Thus, any undue agitation of the liquid can be avoided, ensuring that a contact lens remains in its rest position within inspection trough 22 at the bottom 21 of the receptacle 2. By controlling the infeed speed with which inspection window 3 is immersed in or removed from the liquid also the formation and entrapment of air bubbles at the inspection surface 31 of the inspection window 3 can be avoided. Immersion of the inspection surface 31 of the inspection window 3 into the liquid is also performed such, that when a leading edge 32 of inspection surface 31 of inspection window 3 dips into the liquid contained within receptacle 2, inspection surface 31 and the surface of the liquid at filling level L enclose an angle α in the range of 7° to 21°. At these angles, air bubbles which may be present at the inspection surface 31 of the inspection window 3 may be displaced from the inspection surface, and formation of such air bubbles is also prevented. Once inspection window 3 has been retracted out of the liquid contained in the receptacle 2, the speed of rotation of the levers 7a, 7b back to the initial retracted end position may be increased again (similar to the first phase of the movement of the inspection window 3 towards the receptacle).

Figures 3A, 3B:
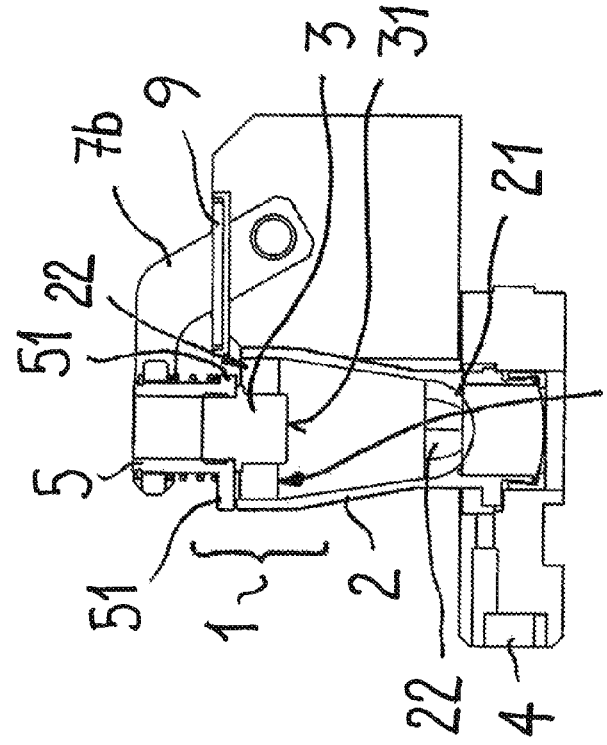
FIGS. 3a and 3b show the lens inspection module of FIGS. 1a and 1b with the receptacle and the associated inspection when they are joined, both, in a side view and in a sectional side view.

FIGS. 3a and 3b show the cuvette system 1 with receptacle 2 and inspection window 3 being joined for inspection. Levers 7a, 7b have been fully rotated to their end position, in which inspection window 3 is positioned in its inspection position in the opening 20 of receptacle 2 in which inspection surface 31 of inspection window 3 is completely immersed in the liquid (e.g. water) contained within receptacle 2. As can be seen from FIG. 3a, radial flange 51 of the tubular housing 5 rests against the abutment lugs 23 at the rim surrounding the opening 20 of receptacle 2. Tubular housing 5 is biased by helical compression spring 52 towards abutment lugs 23. From FIG. 3a and FIG. 3b also the smaller outward radial extension of flange 51 at the side of the tubular housing 5 facing the levers 7a, 7b can be seen. Drainboard 9 extending between the two levers 7a, 7b is located in close vicinity of the receptacle 2 such that any liquid, which may adhere to inspection window 3 and which may drop down upon retraction of the inspection window 3 from the receptacle 2 can be collected by drainboard 9 to avoid water spillage in the inspection station.

Figure 4:
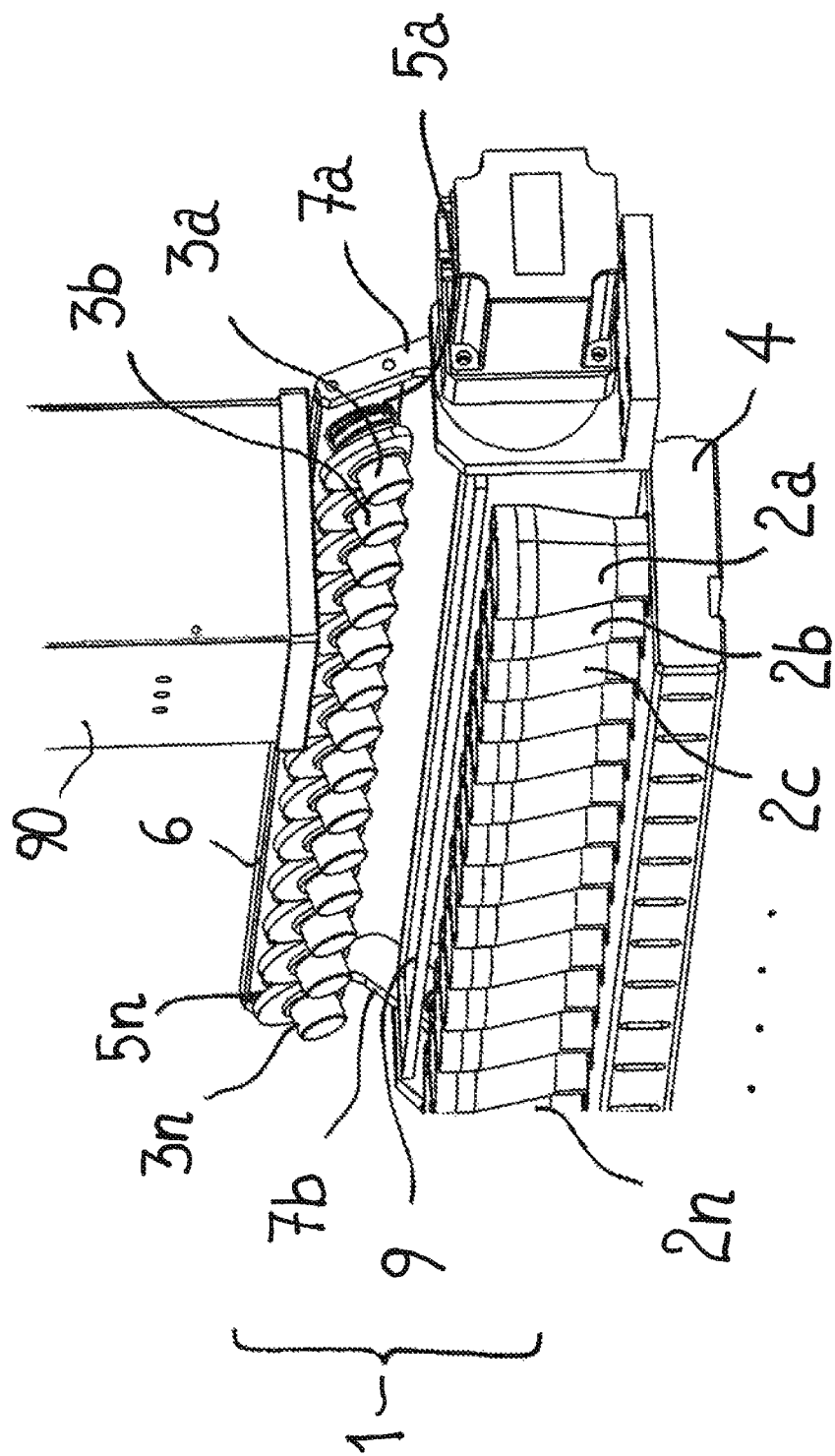
FIG. 4 shows a perspective view of a lens inspection module having a plurality of receptacles and a corresponding plurality of associated inspection windows in retracted position.

In FIG. 4 an arrangement of a plurality of receptacles 2a, 2b, 2c, . . . , 2n and a corresponding plurality of associated inspection windows 3a, 3b, . . . , 3n is shown. The pluralities of receptacles 2a-2n and associated inspection windows 3a-3n again constitute a cuvette system 1. The plurality of receptacles 2a-2n are arranged in linear configuration and are mounted to carrier 4, as has been described above. The associated inspection windows 3a-3n are detachably mounted to tubular housings 5a-5n which are mounted in a corresponding linear configuration to mounting panel 6, which bridges levers 7a, 7b. Levers 7a, 7b are shown in their retracted end position.

Drainboard 9 extends in the direction of mounting panel 6. Above levers 7a, 7b and mounting panel 6 an optical inspection system 90 is arranged. Optical inspection system 90 comprises at least one image-resolving sensor, which may form part of a CCD-camera which may be displaceable along the linear arrangement of receptacles 2a-2n such that during its travel it is at least temporarily placed directly above each receptacle 2a-2n and associated inspection window 3a-3n when the inspection windows 3a-3n are joined with their associated receptacles 2a-2n, so as to successively inspect the contact lenses contained within the receptacles 2a-2n. Alternatively, the optical inspection system 90 may comprise a plurality of image-resolving sensors which corresponds to the plurality of receptacles and associated inspection windows, so that the image-resolving sensors do not have to be displaced but can be arranged stationary within the inspection station. With such an arrangement all contact lenses contained in the plurality of receptacles may be inspected simultaneously. In another embodiment of the invention the optical inspection system may comprise more than one image-resolving sensor, but the number of image-resolving sensors is smaller than the number of receptacles of the linear arrangement of receptacles (for example, two or more CCD-cameras). By an appropriate linear displacement of the optical inspection system all contact lenses in all receptacles may then be optically inspected, but the time needed for inspection of all contact lenses is shorter when compared to a single image-resolving sensor.

While the invention has been described with reference to specific embodiments, it is evident to the person skilled in the art that these embodiments represent only examples of the general teaching underlying the instant invention, and that various changes and modifications are conceivable without departing from the teaching underlying the invention. Therefore, the invention is not intended to be limited by the embodiments described, but rather it is defined by the appended claims.

The invention claimed is:

1. Method for the inspection of contact lenses, the method comprising the steps of:

providing a cuvette system, wherein the cuvette system comprising at least one receptacle for accommodating an ophthalmic lens, said at least one receptacle having a longitudinal extension and an opening arranged at one longitudinal end of the receptacle, and said at least one receptacle being adapted for containing a liquid, said cuvette system further comprising at least one inspection window having an inspection surface, said at least one inspection window being arranged stationary and separate from said at least one receptacle, and wherein said at least one inspection window is adapted for being joined to said at least one receptacle at said opening of said at least one receptacle such that said inspection surface of said at least one inspection window is immersed in said liquid, and wherein said at least one inspection window is further adapted for being removed from said opening of said at least one receptacle;

filling said at least one receptacle of said cuvette system with a liquid;

loading said at least one receptacle with an ophthalmic lens;

transporting said at least one receptacle loaded with said ophthalmic lens to an inspection station;

in said inspection station joining said at least one receptacle with said at least one inspection window such that said inspection surface of said at least one inspection window is immersed in the liquid contained in said at least one receptacle, wherein said inspection surface of said at least one inspection window has a leading edge, and wherein during joining of said at least one inspection window and said at least one receptacle said leading edge of said inspection surface encloses an angle with a surface of said liquid contained in said at least one receptacle in the range of 7° to 21° at the time said leading edge contacts the upper surface of said liquid to get immersed in said liquid;

in said inspection station optically inspecting said ophthalmic lens within said liquid in said at least one receptacle;

after inspection of said ophthalmic lens in said inspection station, removing said at least one inspection window from said at least one; and transporting said at least one receptacle away from said inspection station.

2. Method according to claim 1, wherein said at least one inspection window is joined with said at least one receptacle with an infeed speed of said inspection surface of said at least one inspection window in the range of 0.05 m/s to 0.16 m/s, and wherein said at least one inspection window is removed from said at least one receptacle with a retracting speed of said inspection surface of said at least one inspection window in the range of 0.05 m/s to 0.16 m/s.

3. Method according to claim 1, wherein said at least one receptacle is of cuplike shape having a bottom which is arranged opposite to said opening, and wherein an inspection trough is provided in said bottom for accommodating the ophthalmic lens.

4. Method according to claim 1, wherein said at least one receptacle comprises abutment lugs arranged at said longitudinal end of said at least one receptacle where said opening is arranged, said abutment lugs protruding axially away from said at least one receptacle at said longitudinal end.

5. Method according to claim 4, wherein said at least one inspection window is detachably mounted within a tubular housing having a free end, with said at least one inspection window protruding from said free end of said tubular housing.

6. Method according to claim 5, wherein said tubular housing comprises a flange extending radially outwardly from said tubular housing, and wherein said tubular housing is rotatably arranged between a first end position, in which said at least one inspection window is removed from said at least one receptacle, and a second end position, in which said flange of said tubular housing abuts against said abutment lugs arranged at said longitudinal end of said at least one receptacle.

7. Method according to claim 6, wherein said tubular housing is biased towards said free end thereof.

8. Method according to claim 7, wherein for biasing said tubular housing towards said free end thereof, a helical compression spring is arranged between said flange and a mounting panel to which said tubular housing is mounted.

9. Method according to claim 1, wherein said cuvette system comprising two or more of said receptacles which are arranged in linear configuration and are adapted for being simultaneously transported, and further comprising a number of said inspection windows corresponding to the number of said receptacles, with each of said inspection windows being associated to a corresponding one of said receptacles, wherein said associated inspection windows are arranged stationary and separate from said receptacles in a corresponding linear configuration, and wherein said associated inspection windows are adapted for being simultaneously positioned in said openings of said receptacles such that said inspection surfaces of said inspection windows are immersed in said liquid, and are further adapted for being simultaneously removed from said openings of said receptacles.

10. Method according to claim 9, wherein said cuvette system further comprising a drainboard arranged underneath said linear configuration of said inspection windows and extending parallel to said mounting panel.

* * * * *